(12) United States Patent
Semiz

(10) Patent No.: US 7,770,332 B2
(45) Date of Patent: Aug. 10, 2010

(54) STRUCTURE WITH SPACE APPLICATIONS AND METHODS OF CONSTRUCTION THEREOF

(76) Inventor: Muhamed Semiz, 34 Yorkshire Ter., Apt. 11, Shrewsbury, MA (US) 01545

( * ) Notice: Subject to any disclaimer, the term of this patent is extended or adjusted under 35 U.S.C. 154(b) by 761 days.

(21) Appl. No.: 11/564,917

(22) Filed: Nov. 30, 2006

(65) Prior Publication Data

US 2007/0120348 A1  May 31, 2007

Related U.S. Application Data

(60) Provisional application No. 60/740,742, filed on Nov. 30, 2005.

(51) Int. Cl.
*E04B 1/19* (2006.01)
(52) U.S. Cl. .................... 52/2.11; 52/2.18; 52/2.23
(58) Field of Classification Search ............ 52/2.11, 52/2.12, 2.13, 2.14, 2.15, 2.16, 2.17, 2.18, 52/2.23, 2.24, 2.25, 2.26; 404/71, 1, 17, 404/34; 5/715; 446/221; 244/114 R, 115, 244/171.6
See application file for complete search history.

(56) References Cited

U.S. PATENT DOCUMENTS

| | | | | |
|---|---|---|---|---|
| 2,324,554 A | * | 7/1943 | Billner ..................... 264/31 |
| 2,604,641 A | * | 7/1952 | Reed ......................... 5/710 |
| 2,990,837 A | * | 7/1961 | Cushman ................. 52/2.19 |
| 3,227,169 A | * | 1/1966 | Fischer .................... 52/2.19 |
| 3,497,606 A | * | 2/1970 | Andrews et al. ........... 174/379 |
| 3,638,368 A | | 2/1972 | Pierson ........................ 52/2 |
| 3,779,847 A | * | 12/1973 | Turner ....................... 156/156 |
| 3,877,084 A | * | 4/1975 | Johnson et al. ............. 4/526 |
| 3,885,360 A | * | 5/1975 | Fraioli ....................... 52/2.25 |
| 3,898,775 A | * | 8/1975 | Webb ......................... 52/2.14 |
| 3,903,659 A | * | 9/1975 | Echtler ...................... 52/2.14 |
| 3,924,363 A | * | 12/1975 | Candle ....................... 52/2.19 |
| 3,990,532 A | * | 11/1976 | Robinson .................... 180/164 |
| 4,004,380 A | * | 1/1977 | Kwake ....................... 52/2.18 |
| 4,164,829 A | * | 8/1979 | Sadler ........................ 52/2.14 |
| 4,924,541 A | * | 5/1990 | Inagaki ...................... 5/652.1 |
| 5,044,579 A | | 9/1991 | Bernasconi et al. ..... 244/158 R |
| 5,067,189 A | * | 11/1991 | Weedling et al. ........... 5/81.1 R |
| 5,115,998 A | * | 5/1992 | Olive ......................... 244/31 |
| 5,311,706 A | | 5/1994 | Sallee ........................ 52/2.18 |
| 5,579,609 A | * | 12/1996 | Sallee ........................ 52/2.11 |
| 5,745,942 A | * | 5/1998 | Wilkerson .................. 5/715 |
| 5,918,438 A | * | 7/1999 | South ........................ 52/745.07 |
| 6,029,405 A | * | 2/2000 | Wood ........................ 52/2.23 |
| 6,070,366 A | | 6/2000 | Pierson ...................... 52/2.17 |
| 6,173,922 B1 | | 1/2001 | Hoyt et al. ................. 244/172 |
| 6,332,290 B1 | * | 12/2001 | Delamare ................... 52/2.22 |
| 6,360,490 B1 | | 3/2002 | Cotriss ...................... 52/2.13 |
| 6,491,258 B1 | | 12/2002 | Boyd et al. ................. 244/158 |

(Continued)

OTHER PUBLICATIONS

International Search Report dated Jul. 15, 2007 for PCT/US06/61369 filed Nov. 30, 2006. Applicant: Suresh Gopalan.

(Continued)

*Primary Examiner*—Brian E Glessner
*Assistant Examiner*—James J Buckle, Jr.
(74) *Attorney, Agent, or Firm*—Burns & Levinson LLP; Orlando Lopez

(57) ABSTRACT

A construction object (a structure) that enables access to high altitudes.

13 Claims, 5 Drawing Sheets

U.S. PATENT DOCUMENTS

| | | | | |
|---|---|---|---|---|
| 6,735,800 | B1 * | 5/2004 | Salvatini et al. | 5/713 |
| 6,735,920 | B1 | 5/2004 | Cadogan | 52/741.1 |
| 6,920,722 | B2 | 7/2005 | Brown et al. | 52/108 |
| 2002/0023390 | A1 * | 2/2002 | Nagle | 52/2.18 |
| 2004/0148901 | A1 | 8/2004 | Cadogan et al. | 52/646 |
| 2004/0194219 | A1 * | 10/2004 | Boso et al. | 5/711 |

OTHER PUBLICATIONS

Artsutanov, Y. To the Cosmos by Electric Train. Young Persons' Pravda Sunday Supplement. Jul. 31, 1960.

Edwards, Ph.D., B.C. The Space Elevator. Technical manuscript prepared for NASA Institute for Advanced Concepts. [date unknown].

JP Publication No. 2002362500 published Dec. 18, 2002 to Mitsubishi Heavy Ind. Ltd. [abstract only].

JP Publication No. 2005193722 published Jul. 21, 2005 to Mitsubishi Heavy Ind. Ltd. [abstract only].

* cited by examiner

STRUCTURE WITH SPACE APPLICATIONS AND METHODS OF CONSTRUCTION THEREOF

CROSS REFERENCE TO RELATED APPLICATIONS

This application claims priority of U.S. Provisional Application 60/740,742 entitled "SPACE MOUNTAIN AND METHODS OF CONSTRUCTION THEREOF" filed on Nov. 30, 2005, which is incorporated by reference herein.

BACKGROUND

These teachings relate generally to a construction object (a structure) that enables access to high altitudes, namely, space, and, more particularly, to a construction object that can provide firm support for the vehicles to climb up to space, as well as to descend from space to the ground, and to the method to build this object.

Currently, high altitudes are reached by rocket propelled vehicles which are very costly, dangerous, and inefficient. Current method for the vehicle to descend from the high altitudes to the ground involves either very risky fall through the Earth atmosphere, or its abandonment and destruction since complex and heavy safe-back-to-Earth-enabled construction are not worth the cost of sending it to the space. These methods have been used for the past 50 years and have not improved significantly. It is true that it is less expensive to reach the space today then it was in the past, but it is also true that there is a greater need for easier access to the space. The greater need for routine access to the space resulted in space shuttle project by NASA. This project failed to provide cheap and easy access to the space; on the contrary, it proved to be even more costly and risky. Space shuttle utilized the same basic principle of rocket engine to move the vehicle up to the high altitudes and it differs from previous methods by utilizing the same piece of rocket for the next flights. Need for easy and routine access to the space resulted also in Spaceship One project by Scaled Composites LLC. This project combined reaching high altitudes by airplane and then shooting up the rocket from the high altitude further to the space. This method proved to be cheaper then the ones used before, but it still relying on rocket engines to pass the most critical and longest part of the trip to the space.

Alternative concepts that do not use rocket engine to reach the space are the space elevator proposed by Yuri Artsutanov (see also Bradley Edwards, "The Space Elevator," Phase I Study—NASA Institute for Advanced Concepts, Report June, 2000, which is hereby incorporated by reference) and space fountain proposed by Robert L. Forward and others. Space elevator's main advantage would be to give firm support to the vehicles to climb up to the space via long rope that is hanging from the space by utilizing centrifugal force of the Earth rotation rather then to use explosive action to push vehicles up. Drawback of space elevator proposal is that today's technology cannot find materials which would enable space elevator to be built. Space fountain concept involves building high tower that would be held straight up by shooting up massive pallets. When the pallets would hit the upper end they would be directed down, and the force of their redirection would keep the upper end from falling. Drawback of this method is that it needs constant power input to stay up and is in essence similar to rocket propelled vehicle that constantly stays up.

Simple, routine, and inexpensive access to the space would have enormous impact on our lives and lives of the future generations. It is therefore a need to provide easy access to the space by the vehicles that could climb up to the space instead of being fired up, as well as to provide the easy access to the Earth from the space for the same vehicles. Easy access would open the door to the new frontiers and to not so rich countries, companies, and people. This massive access to the space would in return provide benefits to the whole mankind.

BRIEF SUMMARY

In one embodiment the structure of these teachings includes one or more base inflatable objects disposed on a surface and one or more other inflatable objects disposed on the one or more base inflatable objects.

For a better understanding of the present teachings, together with other and further objects thereof, reference is made to the accompanying drawings and detailed description and its scope will be pointed out in the appended claims.

DETAILED DESCRIPTION

In one embodiment, a structure of present teachings provides traffic lines which would provide firm support to the vehicles to climb up from the planet surface to the space, and descend from the space to the planet surface. Firm support for the traffic lines can be accomplished by building the structure ("mountain," see FIG. 2) with desired height. In one embodiment, construction elements to built this mountain would be gas filled balloons (also referred to as inflatable objects).

Figure 1:
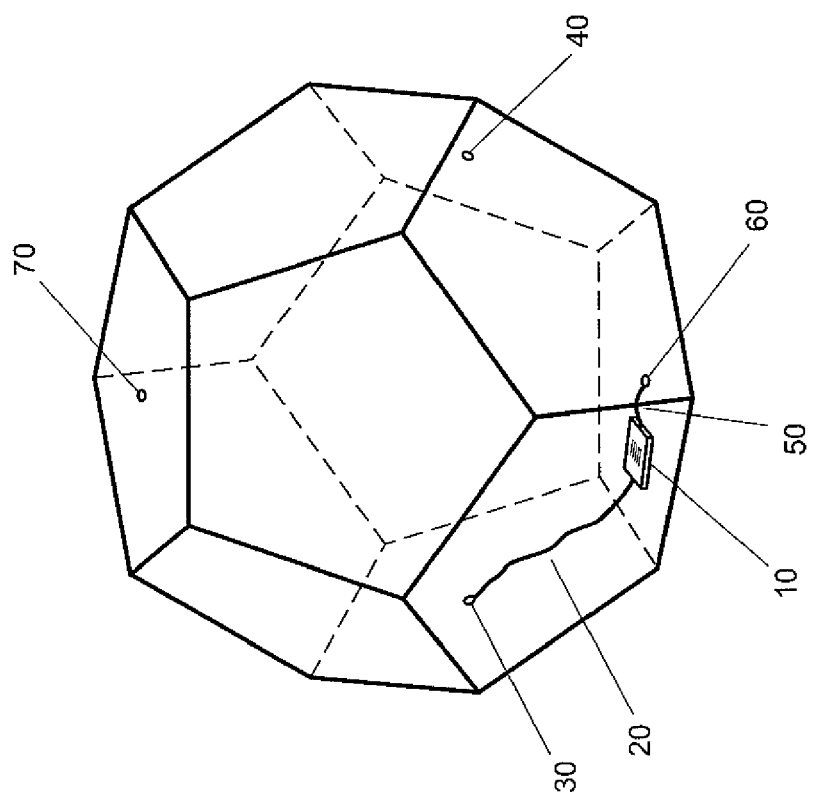
FIG. 1 is a graphical schematic representation of a cross-section of a component of an embodiment of the system of these teachings.

FIG. 1 depicts a cross-section of a balloon in an embodiment of a structure of these teachings. External connections and the airflow are shown in FIG. 1. Referring to FIG. 1, the inflatable object shown therein includes a compressor, sensory mechanisms (sonar and/or a laser in one embodiment), a communication component (two-way radio one embodiment) and a computer system for communication and control (the enablement, communication and control subsystem 10 in FIG. 1), connecting openings for lateral 30, 40 and for vertical 60, 70 connection to the exterior atmosphere or to other inflatable objects. Conduits 20, 50 operatively connect the openings to the enablement, communication and control subsystem 10. In one instance, a valve is inserted in the openings. In the embodiment shown in FIG. 1, the valve inserted in one of the lateral opening 30 allows the intake of fluid into the inflatable object while the valve inserted in the other lateral opening 40 allows only the exhaust of fluid from the inflatable object. In the embodiment shown in FIG. 1, the valve inserted in one of the vertical openings 60 allows the exhaust of fluid from the inflatable object while the valve inserted in the other vertical opening 70 only allows the intake of fluid into the inflatable object.

Figure 5:
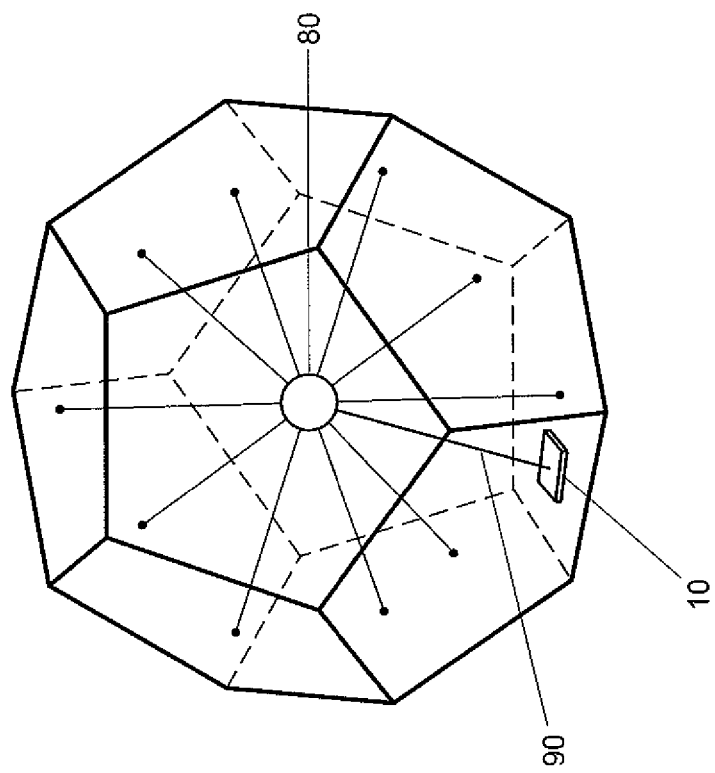
FIG. 5 represents a cross-section of a component of an embodiment of a structure of these teachings showing sensory mechanisms.

A cross-section of an inflatable object in an embodiment of the structure of these teachings showing sensory mechanisms is shown in FIG. 5. In the embodiment shown in FIG. 5, a sensory device 80 has sensing lines (elastic lines in one embodiment) attached to the facets of the inflatable object. The sensing device 80 is operatively connected to the enablement, communication and control subsystem 10 by means of a connection component 90 (a communication line or cable in one embodiment).

In order to build high objects, among other considerations, the strain on materials at the bottom of the object due to its weight has to be accounted for, and, the risk of tipping over due to high gravitational point has to be overcome. By using gas filled bubbles, it is possible to account for the strain on materials at the bottom of the object (See FIG. 4).

Figure 4:
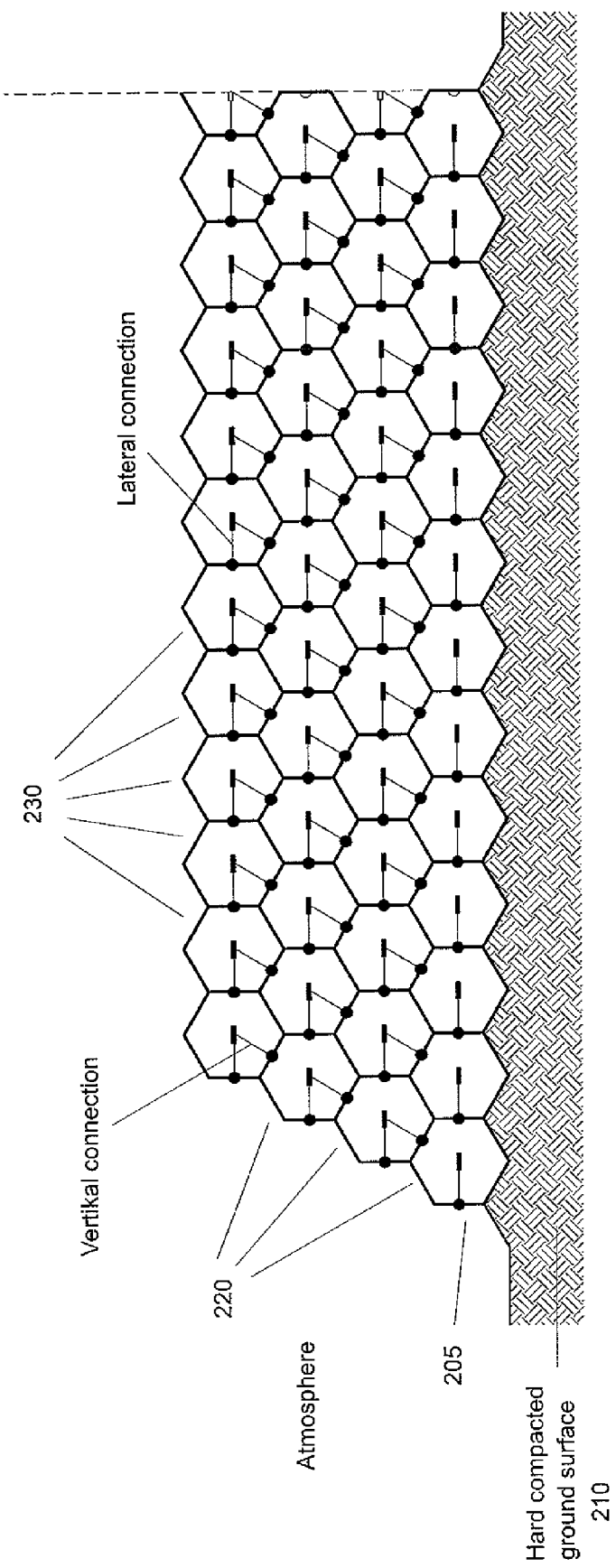
FIG. 4 depicts a portion of an embodiment of a structure of these teachings comprising multiple inflatable objects.

A portion of an embodiment of the structure of these teachings, including multiple inflatable objects, is shown in FIG. 4. In the embodiment shown in FIG. 4, the inflatable objects 205 at the bottom layer are disposed on a surface 210. In one instance, the surface is adapted to receive the inflatable objects in the shape that the objects would assuming when inflated (a dodecahedron in one embodiment). Inflatable objects 220 at the periphery of the structure take in gas from the atmosphere. In the embodiment shown in FIG. 4, the pressure inside the inflatable objects 220 close to the periphery of the structure is higher than the atmospheric pressure. Inflatable objects 230 in the interior of the structure take in fluid (gas or air) from the surrounding inflatable objects. The pressure inside interior inflatable objects 230 is higher than the pressure inside the inflatable objects 220 at the periphery of the structure. The pressure inside the inflatable objects is higher in the inflatable objects located a way from the periphery of the structure and is higher for the inflatable objects located closer to the bottom of the structure.

High pressure of the structure weight at the bottom of the object can be overcome by high pressures inside of the bubbles. High pressure inside of the individual bubble would not result with bursting of the bubble because neighboring bubble would also be under high pressure to keep the inner bubble from overstretching and bursting. In this manner, inner, bottom, bubbles would be under highest pressures, and the pressure would gradually decline towards outer sides and upper levels of the entire object.

Means to reach those high pressures, in one embodiment, include installing compressors into each bubble and connecting bubbles horizontally. The compressors would produce airflow starting from the outer edge of the object and going towards its center. Outer bubbles would take gas from the atmosphere while inner bubbles would take gas from the neighboring, outer, side bubble (See FIG. 4). In this manner, pressure in the center of the mountain would be built jointly by the power of all compressors at the same level. All balloons would substantially tightly lean on each other to avoid big pressure differences between high inner pressures in the bubbles and low outer atmospheric pressure. By substantially tightly packing basic elements of the mountain, bubbles would take natural shape which would enable inside pressure to push equally to all its sides shaping inner bubbles, just as soap bubbles are, in one embodiment substantially a dodecahedron, 12 octagonal sided balls.

In another embodiment, bubbles (balloons or inflatable objects) could also have vertical connections (70 and 60, FIG. 1). This connection would enable flow from the higher levels of the mountain to the lower levels. This flow would be triggered by bubbles stretching. In one instance, bubble stretching as well as condition inside the bubble are monitored. Monitoring of those condition can be performed by either elastic ropes attached to inner opposing sides of the bubble so that bubble stretching can be measured by measuring the stretching of those ropes (FIG. 5, 80), or by laser or sonar device that can sense inner bubble space (FIG. 5, 10). When bubbles stretch to the certain point beyond which they can suffer the damage, extra air from the bubble is pumped down to the lower levels. In this manner, vertical flow would not just preserve shape and stability of the bubbles when they reach higher altitudes, but also speeds up inflation of the lower levels of the mountain. To enable smooth functions of the building through joint work of each bubble, in one embodiment, each bubble is equipped with hardware and appropriate software to turn on and off the compressor, and to direct air flow in right direction. (In one instance, the hardware includes one or more processors and one or more computer usable media having computer readable code, software, embodied therein. The computer readable code is capable of causing the one or more processors to turn the compressor on and off and direct airflow in the desired direction, and, in one instance, control the communication component.) In one embodiment, the hardware has a communication unit capable of connecting the hardware with a corresponding control unit for appropriate communication between control unit and bubbles. (In one instance, the control unit includes one or more processors and one or more computer usable media having computer readable code, software, embodied therein. The computer readable code goes into one or more processors to execute the control methods.) In one instance, control units are assigned for each level or segment of the object, and the control units are connected to a central control unit that oversees entire operation. Controls can be hard wired or wireless to avoid putting extra weight into object.

Another obstacle in building high object, tipping over due to high gravitational point, in one embodiment, is resolved by building the object in the shape of a mountain. In this manner, the entire object would be robust and this shape would also provide for gradual climb to the higher altitudes as well as multiple lines from the ground to the space (See FIGS. 2 and 3)

In one embodiment, a "mountain like" structure is obtained by having a number of inflatable objects in each subsequent to the higher layer be at least equal to or smaller than the number of inflatable objects in the supporting layers. In a "mountain like" structure the number of inflatable objects in the uppermost layer is smaller than the number of inflatable objects in the base or bottom layer.

Figure 2:
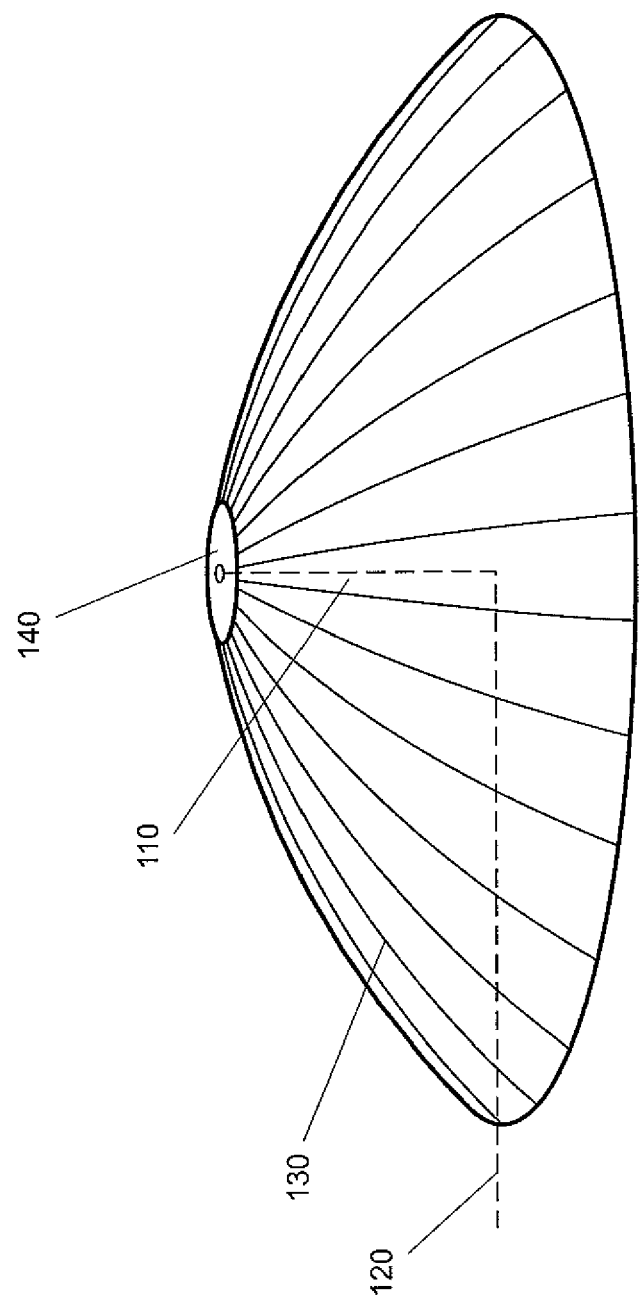
FIG. 2 is a schematic representation of a side view of an embodiment of a structure of these teachings.

FIG. 2 depicts a side view of an embodiment of a structure of these teachings showing its shape, multiple surface traffic lines 130 leading from the ground to the space and vice versa, and internal traffic lines 120 leading through the ground and up 110 through the middle of the object to the top of the structure in the space "Mountain." In embodiments, such as shown in FIG. 2, where an inner traffic line (inner tube) 110 is present, an internal traffic line (tunnel) 120 through the ground and connecting to the inner tube 110 provides access to the inner tube 110.

Figure 3:
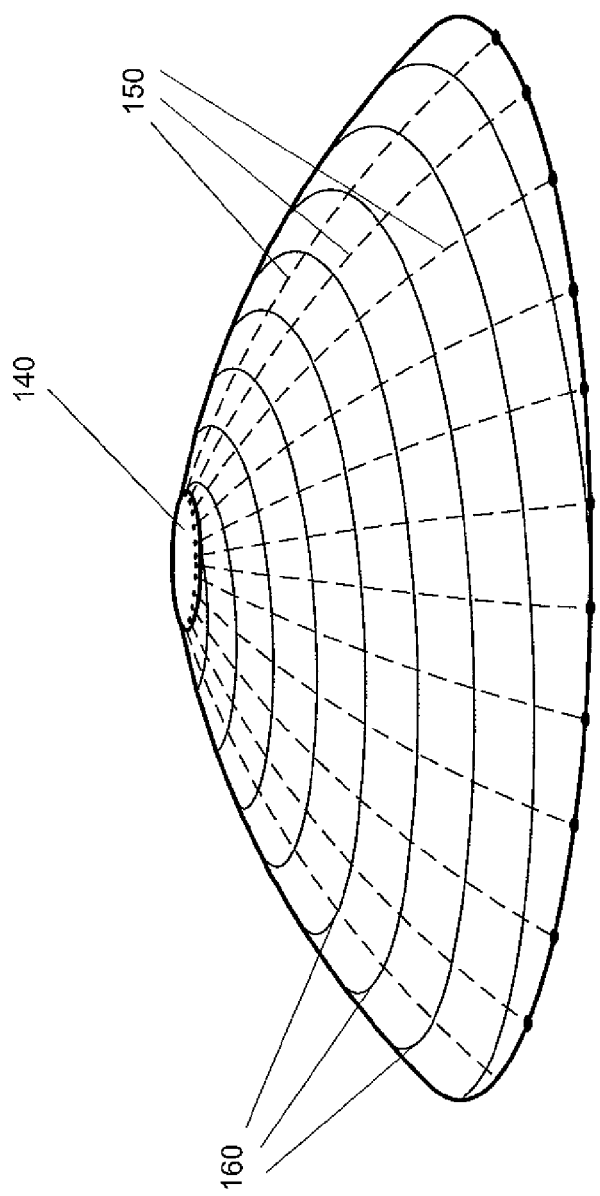
FIG. 3 is a schematic representation of a side view of an embodiment of another structure of these teachings.

FIG. 3 depicts a side view of another embodiment of a structure of these teachings showing alternative traffic lines—outer spiral lines 160 and inner lines (inner tubes) 150 at other than a 90° degree angle.

An embodiment of the method for building the "mountain" includes the following steps:

a. Laying down first, ground, layer of balloons in the circle with the size optimal to its height.

b. Testing balloons by blowing them to the relative pressures they are suppose to withstand.

c. Checking all connections, compressors, leaks, sensors, cracks etc.

d. Deflating the balloons.

e. Laying down second layer of the balloons in the circle shorter then the previous one so mountain shape can be made.

f. Repeating the steps two, three and four.

g. Doing this over and over until we have necessary number of levels that, when blown, would make the space mountain.

h. Final blowing of the mountain starting from the top levels, thus raising the mountaintop to the space.

In one embodiment, on the top of the mountain includes a facility such as, but not limited to, a space harbor 140 (FIG. 2)—a complex traffic regulating object to facilitate smooth departure of the cargo and people from the traffic lines further to the space and to coordinate it with arrivals of people and cargo from the space and attaching them to the traffic lines for the descend. The top of the mountain, in several embodiments, has other facilities such as, but not limited to, science labs, telescope observatories, industrial, tourist and living facilities. In the embodiment in which the top of the mountain includes a facility (also referred to as another structure), the method of these teachings also includes building the facility partially or entirely while the "mountain" is still laying deflated on the ground, so that construction would not have to be done in zero atmosphere at high altitudes.

In one embodiment, the top of the "mountain" is also used as a lower point (anchor point) for the space elevator. Present day materials would allow building space elevator from higher altitudes. The Space "Mountain" could be raised up to the point where the cable could be attached to the top of the Space "Mountain." A second side of the cable would be attached to the counterweight as proposed by the Space Elevator project and cable could be used to climb further into space.

In one instance, alternative traffic lines (110, FIG. 2 or 150, FIG. 3) are located inside of the mountain from the bottom to its top. This embodiment of space elevator set in the tube that goes from the top to its bottom would have as an advantages shorter distance from the bottom to the top and also it would not be affected by the weather elements outside of the mountain. For this traffic line, a traffic tunnel 120 is provided in order to connect a vertical tube with outside of the mountain (see FIG. 2).

Another alternative traffic line embodiment has the traffic lines going in a spiral shape 160 (FIG. 3). Spiral shape traffic line would be less steep, but it would have longer distance from the bottom to the top (see FIG. 3). In one embodiment, the inner tubes (conduits) are placed at a desired angle.

Although the teachings have been described with respect to various embodiments, it should be realized these teachings are also capable of a wide variety of further and other embodiments within the spirit and scope of the appended claims.

What is claimed is:

1. A structure comprising:
   at least one base inflatable object disposed on a surface; and
   at least one other inflatable object disposed on said at least one base inflatable object;
   said at least one base inflatable object being operatively connected to said at least one other inflatable object; said operative connection enabling airflow between said at least one base inflatable object and said at least one other inflatable object; and
   at least one conduit from said surface to a top surface of said structure, said conduit being disposed on said at least one base inflatable object and on said at least one other inflatable object;
   wherein said at least one base inflatable object comprises at least two base inflatable objects; and
   wherein said at least one other inflatable object comprises at least two other inflatable objects.

2. The structure of claim 1 further comprising further comprising at least one further other inflatable object disposed on said at least one other inflatable object;
   said at least one other inflatable object being operatively connected to said at least one further other inflatable object; said operative connection enabling airflow between said at least one other inflatable object and said at least one further other inflatable object.

3. The structure of claim 1 further comprising another conduit;
   said another conduit being disposed between one of said at least two base inflatable objects and another one of said at least two base inflatable objects.

4. The structure of claim 3 where in said another conduit is also disposed between one of said at least two other inflatable objects and another one of said at least two other inflatable objects.

5. The structure of claim 3 wherein said another conduit is also substantially vertically disposed at a center of said structure.

6. The structure of claim 1 wherein a width of the structure, in a direction substantially parallel to said surface and at a height smaller than a height of the structure, decreases with increasing height.

7. The structure of claim 1 wherein said structure serves as an anchor point for a space elevator.

8. A structure comprising:
   at least one base inflatable object disposed on a surface; and
   at least one other inflatable object disposed on said at least one base inflatable object;
   said at least one base inflatable object being operatively connected to said at least one other inflatable object; said operative connection enabling airflow between said at least one base inflatable object and said at least one other inflatable object;
   wherein said at least one base inflatable object comprises at least three base inflatable objects;
   wherein each one of said at least three base inflatable objects comprises a compressor;
   each one of said at least three base inflatable objects being operatively connected in series to another one of said at least three base inflatable objects;
   outer ones of said at least three base inflatable objects receiving fluid from an external atmosphere, said outer ones being located substantially at a periphery of the structure;
   inner ones of said at least three base inflatable objects receiving fluid and providing fluid to neighboring ones of said at least three base inflatable objects;
   whereby high pressure inside each of the at least three base inflatable objects is achieved.

9. A structure comprising:
   at least one base inflatable object disposed on a surface; and
   at least one other inflatable object disposed on said at least one base inflatable object;
   said at least one base inflatable object being operatively connected to said at least one other inflatable object; said operative connection enabling airflow between said at least one base inflatable object and said at least one other inflatable object;

wherein said at least one other inflatable object comprises at least two other inflatable objects;

wherein each one of said at least two other inflatable objects comprises a compressor;

each one of said at least two other inflatable objects being operatively connected in series to another one of said at least two other inflatable objects;

outer ones of said at least two other inflatable objects receiving fluid from an external atmosphere, said outer ones being located substantially at a periphery of the structure;

inner ones of said at least two other inflatable objects receiving fluid and providing fluid to neighboring ones of said at least two other inflatable objects;

each one said at least two other inflatable objects being operatively connected to one base inflatable object from said at least three base inflatable objects; the operative connection enabling flow from one of said at least two other inflatable objects to a corresponding one of said at least three base inflatable objects.

10. A structure comprising:

a plurality of base inflatable objects disposed on a surface;

wherein each one of said plurality of base inflatable objects comprises a compressor and a control component;

each one of said at plurality of base inflatable objects being operatively connected in series to another one of said at least three base inflatable objects;

outer ones of said plurality of base inflatable objects receiving fluid from an external atmosphere, said outer ones being located substantially at a periphery of the structure;

inner ones of said plurality of base inflatable objects receiving fluid and providing fluid to neighboring ones of said plurality of base inflatable objects; and a number of pluralities of other inflatable objects; a first plurality of said number of pluralities of other inflatable objects being disposed on said plurality of base inflatable objects;

wherein each inflatable object from said number of pluralities of other inflatable objects comprises a compressor and a control component;

each inflatable object from one plurality of said number of pluralities of other inflatable objects being operatively connected in series to another inflatable object from said one plurality from said number of pluralities of other inflatable objects;

outer inflatable objects from said number of pluralities of other inflatable objects receiving fluid from an external atmosphere, said outer inflatable objects being located substantially at a periphery of the structure;

inner inflatable objects from said number of pluralities of other inflatable objects receiving fluid and providing fluid to neighboring inflatable objects from said number of pluralities of other inflatable objects;

each inflatable object from said first plurality from said number of pluralities of other inflatable objects being operatively connected to one base inflatable object from said plurality of base inflatable objects; the operative connection enabling flow from one inflatable object from said first plurality from said number of pluralities of other inflatable objects to a corresponding one of said plurality of base inflatable objects;

a number of inflatable objects in an uppermost plurality from said number of pluralities of other inflatable objects being smaller than a number of base inflatable objects in said plurality of base inflatable objects.

11. The structure of claim 10 wherein each base inflatable object from said plurality of base inflatable objects further comprises means for monitoring dimensions of said each base inflatable object when inflated; and wherein each inflatable object from said number of pluralities of other inflatable objects further comprises means for monitoring dimensions of said each inflatable object when inflated.

12. The structure of claim 10 wherein another structure is disposed on said uppermost plurality from said number of pluralities of other inflatable objects.

13. The structure of claim 12 wherein said another structure provides a function selected from space harbor, space observatory, industrial facility, science research facility, tourist facility, communication tower, solar power plant, rain water collection, and wind farm.

* * * * *

UNITED STATES PATENT AND TRADEMARK OFFICE
CERTIFICATE OF CORRECTION

PATENT NO.        : 7,770,332 B2
APPLICATION NO.   : 11/564917
DATED             : August 10, 2010
INVENTOR(S)       : Muhamed Semiz It is certified that error appears in the above-identified patent and that said Letters Patent is hereby corrected as shown below:

On the title page, item (56); under OTHER PUBLICATIONS, "Applicant: Suresh Gopalan" should read -- Applicant: Muhamed Semiz --

In column 6, lines 9-10 (claim 2), "further comprising further comprising at least one" should read -- further comprising at least one --

In column 6, line 22 (claim 4), "where in said another conduit" should read -- wherein said another conduit --

In column 7, line 18 (claim 9), "each one said at least" should read -- each one of said at least --

In column 7, line 28 (claim 10), "each one of said at plurality" should read -- each one of said plurality --

Signed and Sealed this

Twenty-third Day of November, 2010

David J. Kappos
*Director of the United States Patent and Trademark Office*